(12) United States Patent
Wilson et al.

(10) Patent No.: US 6,988,552 B2
(45) Date of Patent: Jan. 24, 2006

(54) LIQUID CARBON DIOXIDE CLEANING OF WELLBORES AND NEAR-WELLBORE AREAS

(75) Inventors: Dennis Ray Wilson, Katy, TX (US); Thomas A. Bell, Jr., Lafayette, LA (US)

(73) Assignee: ConocoPhillips Company, Houston, TX (US)

( * ) Notice: Subject to any disclaimer, the term of this patent is extended or adjusted under 35 U.S.C. 154(b) by 197 days.

(21) Appl. No.: 10/465,371

(22) Filed: Jun. 19, 2003

(65) Prior Publication Data

US 2004/0256104 A1   Dec. 23, 2004

(51) Int. Cl.
  *E21B 36/00*  (2006.01)
  *E21B 37/00*  (2006.01)
  *E21B 43/25*  (2006.01)

(52) U.S. Cl. .................. 166/302; 166/304; 166/312; 507/266; 507/927; 507/929

(58) Field of Classification Search ............ 166/302, 166/304, 308.2, 312; 507/266, 927, 929, 507/930, 931
See application file for complete search history.

(56) References Cited

U.S. PATENT DOCUMENTS

| | | | |
|---|---|---|---|
| 3,368,627 A | * | 2/1968 | Hurst et al. ............... 166/307 |
| 3,765,488 A | * | 10/1973 | Pence, Jr. ................ 166/308.6 |
| 3,954,636 A | | 5/1976 | Crowe et al. |
| 4,390,068 A | | 6/1983 | Patton et al. .............. 166/267 |
| 4,501,675 A | | 2/1985 | Malloy et al. |
| 4,519,455 A | * | 5/1985 | Holtmyer et al. ......... 166/305.1 |
| 4,617,993 A | | 10/1986 | Brown ...................... 166/250 |
| 4,628,999 A | | 12/1986 | Kiss et al. ................. 166/274 |
| 4,679,627 A | | 7/1987 | Harrison ................... 166/249 |
| 5,099,924 A | * | 3/1992 | Gidley ...................... 166/307 |
| 5,168,930 A | * | 12/1992 | Wiseman et al. .......... 166/307 |
| 5,358,046 A | | 10/1994 | Sydansk et al. ........... 166/275 |
| 5,394,942 A | | 3/1995 | Catania et al. ............ 166/302 |
| 6,105,672 A | | 8/2000 | Deruyter et al. .......... 166/270.1 |
| 6,505,681 B2 | * | 1/2003 | Catanla et al. .......... 166/250.07 |

OTHER PUBLICATIONS

Gidley et al., "CO$_2$ overcomes sandstone acidizing problems", *Oil & Gas Journal*, Sep. 30, 2002.

Mike Crabtree et al., "Fighting Scale-Removal and Prevention", Oilfield Review, Autumn 1999, pp. 30-45.

* cited by examiner

*Primary Examiner*—George Suchfield
(74) *Attorney, Agent, or Firm*—Hitchcock Evert LLP

(57) ABSTRACT

A method to clean the wellbore and the near wellbore formation adjacent to the wellbore of the gas bearing formation adjacent to the production zone of the wellbore. The method includes the steps of injecting a treatment liquid containing from 84.5 to 100% of liquid carbon dioxide, 0 to 15% of an alcohol, and 0 to 0.5% of a surfactant into the well in a predetermined quantity and maintaining the pressure of the treatment liquid in the near wellbore formation of the gas bearing formation below the fracturing pressure of the formation, releasing the pressure on the wellbore and allowing the liquid CO$_2$ to vaporize and other materials to blow out of the well.

23 Claims, 1 Drawing Sheet

LIQUID CARBON DIOXIDE CLEANING OF WELLBORES AND NEAR-WELLBORE AREAS

TECHNICAL FIELD

The present invention relates to a method to clean gas wells and in particular a method utilizing liquid carbon dioxide to clean a wellbore and the near-wellbore area of the gas bearing formation.

BACKGROUND OF THE INVENTION

Gas wells produce gas and usually also produce water and petroleum condensates. Typically, in the completion of the well, the wellbore is drilled into a gas bearing formation. Many times a casing is placed in the gas formation. In order to put the formation into production, the casing is perforated to provide access and flow paths to the gas bearing formation. The gas bearing formation can also be fractured utilizing a fracturing fluid to increase production. The purpose of fracturing is to provide additional pathways to allow the flow of gas from the formation to the wellbore. Many times fracturing is done with a fracturing fluid that includes a proppant. The proppant is carried into the fractures with the fracturing fluid and when pressure is released on the fracturing fluid the proppant remains behind and serves to hold open the fractures when the pressure is released. Usually tubing is inserted into the casing to provide a conduit for flow of the production from the well.

In older wells which have been producing for a while, plunger lift techniques can be used to assist production. As a well ages, greater amounts of water and condensates or a portion thereof usually are not expelled from the well and flow back down the wellbore into the near wellbore area. Plunger lift techniques can be used in wells to remove liquids and aid in gas production. Wells using plunger lift are particularly prone to producing water and condensates with some asphaltines as a result of the plunger lift operation.

In intermittent flow wells assisted by plunger lift, there is flowback to the well during the pumping cycle. This flowback can contain asphaltines and other heavies from the petroleum condensates produced. In severe cases these asphaltines can build up on the casing or tubing as well as on the surface of the formation adjacent the wellbore. This can result in the well production being substantially reduced or result in the cessation of production from the well. Water in the formation from flowback can invade the capillaries of the gas bearing formation and result in the blocking or substantial decreasing of the flow of gas from the formation to the wellbore. The formation of scale or deposits on the surfaces of the formation and on the tubing is referred to generally as skin damage.

Thus, there has been a need for a method to clean the area of the gas bearing formation adjacent to the production zone of the wellbore, as well as the casing and tubing, in order to increase production or bring the well back into production. The present invention has the benefit of being an inexpensive and rather rapid method to remove the skin damage thereby cleaning the near wellbore formation of these deposits.

As used in this application, the "near wellbore formation" refers to the volume of the formation which is adjacent to the production zone or zones to be treated and can include all or part of formation through which fissures created by well stimulation (fracturing) extend.

BRIEF SUMMARY OF THE DRAWINGS

The present invention will be more fully understood from embodiments of the invention described in the detailed description together with the drawings provided to aid in understanding, but not limit the invention.

SUMMARY OF THE INVENTION

Figure 1:
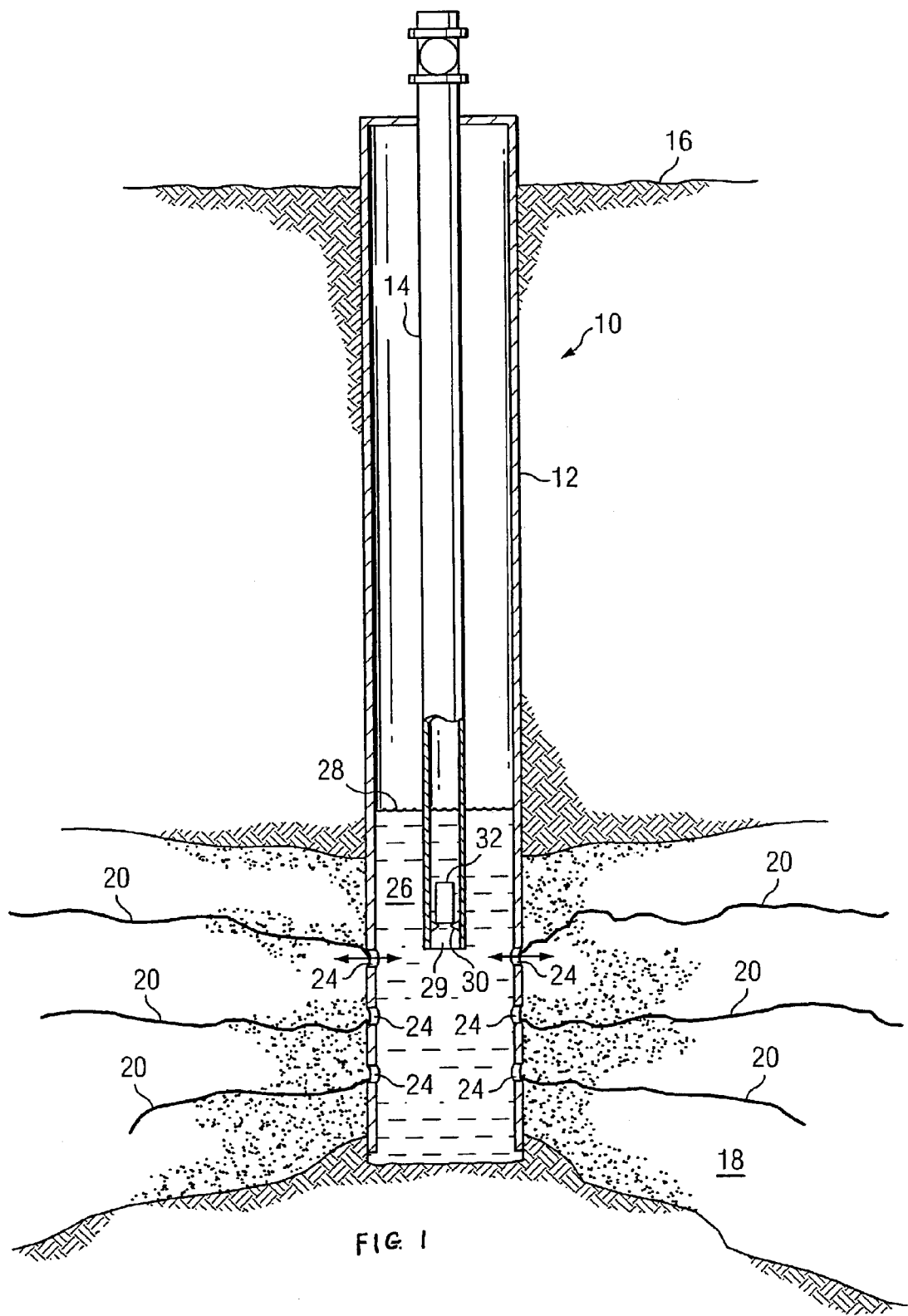
FIG. 1 is a cross sectional schematic illustration of the present invention.

In one embodiment, the invention is a method to clean a gas well by injecting a predetermined quantity of liquid carbon dioxide into the wellbore and the near wellbore formation such that the pressure in the formation is below the formation fracturing pressure. Thereafter, the pressure is released and the liquid $CO_2$ is allowed to vaporize and flow from the well back to the surface. In a preferred embodiment, the liquid $CO_2$ is pumped at a pressure such that the pressure in the formation is about 75% or less of the fracturing pressure of the gas bearing formation. In another preferred embodiment, the pressure of liquid $CO_2$ in the formation is about 50% or less of the fracturing pressure of the gas formation.

In another embodiment of the invention other components may be added to the liquid $CO_2$ such as a minor quantity of a compatible surfactant and/or a minor quantity of an alcohol. A compatible surfactant is one which does not form an emulsion when mixed with water and/or condensates from the well (liquid provided in the well) to be treated. Also, the compatible surfactant is one which will not create an emulsion when combined with liquid produced in the well and the alcohol, if used, to treat the well. The alcohol used may be any alcohol which reduces the surface tension of water.

In a preferred embodiment, a well is treated with a mixture of liquid $CO_2$ and surfactant or alcohol or a combination of surfactant and alcohol. The relative proportions of the treatment can be in the usage by volume of:

|  | Preferred | Most Preferred |
|---|---|---|
| Liquid $CO_2$ | 84.5 to 100% | 88.8 to 100% |
| Alcohol | 0 to 15% | 0 to 11% |
| Surfactant | 0 to 0.5% | 0 to 0.2% |

If desired, a small portion of the alcohol can be injected separately before the injection of the treatment mixture.

DETAILED DESCRIPTION

A gas well normally produces not only gas, but also water and condensates. Typically, as the gas flows from the formation its pressure decreases which may cause heavier components to condense and be left in the formation or on the surface of the tubing and/or casing. These condensates can result in a water blockage of the formation. This occurs when water is trapped in pores and small fractures, and the gas from outside of the near wellbore formation cannot overcome the capillary pressure to push the water from these fractures into the wellbore. Also, the condensates can result in the formation of a skin damage or scale on the near wellbore formation adjacent to the wellbore. This skin damage is normally comprised of water and/or heavier asphaltines and other petroleum condensates. Cleaning of a well by the method of the present invention can result in an increase of the production rate, and can also bring a non-producing well back into production.

In a typical gas well completion, the gas bearing formation is fractured by known techniques to increase the rate of flow from the formation. Well stimulation techniques usually leave proppant behind to prop open the fractures created by the fracturing operation. Thus, for most wells there will be a record of the pressure at which the formation was fractured. Alternatively, fracture pressure can be determined by reviewing records of nearby wells. The fracturing pressure is also known as the break down pressure of the formation.

A well can become partially or completely blocked by a number of causes. A film of asphaltines or other condensates can form on the rock faces in the fissures created during the fracturing process, and the rock face may also become plugged by water trapped in the pores of the rock. The method of the present invention is a process which cleans the tubing string, the fissures and the rock face of the near wellbore formation with liquid $CO_2$ or mixtures of liquid $CO_2$, a surfactant or alcohol or combinations thereof FIG. 1 is provided to assist in the understanding of the invention. Wellbore 10 contain casing 12, and within the casing 12 is tubing 14. Wellbore 10 extends from the surface 16 and into gas bearing formation 18. Extending through a portion of the formation 18 are fractures 20 created by well stimulation techniques. Perforations 24 in the casing 12 allow transference of gas and liquid between the wellbore and gas bearing formation. As a well ages, the flow rate of gas slows. A well typically also produces water and petroleum condensates. Initially, the velocity and volume of gas flow from the well can be sufficient to carry liquids to the surface. As the flow rate and volume of gas falls with age, the liquid is not completely carried from the well and begins to collect in different at the different depths of the liquid. If $P_1$ increases sufficiently, the pressure of liquid at the perforations 24 in the casing 12 and/or at the lower opening 29 of the tubing 14 to increase to a point where the pressure of the gas in the formation is exceeded, preventing gas flow from the well. Plunger lift techniques can be used to remove liquid from the well.

A simplified view of the plunger is shown. Stop 30 at the bottom of the tubing 14 preventing plunger 32 from falling out of the tubing. In plunger lift operating wells, the well is shut in (flow from the well is stopped). This allows the gas in the well to build pressure. The well is opened and the gas will push the plunger and the water on top of plunger to the surface. The well is again shut in and the process repeated. As a result of this cyclical action, the liquids in the wellbore flow into and out of perforations 24. As a result of pressure and temperature changes, the solubility of the liquid changes. These changes can result in scale or heavy liquid buildup in the near wellbore formation. These deposits can result in blockage or restriction of the pores in the rock, the fractures in the rock and in the well perforations, as well as other portions. The present invention removes scale and heavy liquids from the near wellbore formation and some portions of the casing and tubing.

In the present invention, liquid $CO_2$ is pumped into the well such that the pressure in the near wellbore formation is below the fracturing pressure of the formation. The pressure in the near wellbore formation will be approximately the pressure the pump is applying at the surface together with the pressure resulting from the hydrostatic head of the column of liquid $CO_2$ or the liquid $CO_2$ treating mixture in the wellbore. Preferably, liquid $CO_2$ is pumped into the formation such that the pressure of the liquid $CO_2$ in the near wellbore formation is less than the fracturing pressure and, preferably, at a pressure which is 75% or less of the fracturing pressure, and more preferably, 50% or less of the fracturing pressure. Exceeding the fracturing pressure will result in the loss of liquid $CO_2$, because the liquid $CO_2$ will then fracture the formation creating fissures that will allow the liquid $CO_2$ to vaporize and escape into the formation rather than have the majority of the liquid $CO_2$ remain in the near wellbore area of the formation where it will dissolve the condensates and water.

Thus, if the pressure of liquid $CO_2$ in the near wellbore formation exceeds the fractioning pressure of formation, the liquid $CO_2$ will create new fissures in the rock which allow the liquid $CO_2$ to bypass the area to be treated. It is believed that by maintaining the pressure of the liquid $CO_2$ in the near wellbore formation below the fracture pressure of the formation, the liquid $CO_2$ will remain in contact with the rock face for a sufficient period of time to dissolve or absorb materials on or at the rock face. It is expected that even though the $CO_2$ pressure is maintained below the fractioning pressure, there will be some $CO_2$ loss by vaporization through the pores in the rock, but will be slow enough to be offset by the pumping rate at the surface.

The volume of liquid $CO_2$ injected or pumped into the well is an amount sufficient to fill at least a portion of the volume of the near wellbore formation adjacent to the wellbore. It is preferred to pump 2000 gallons or more of liquid carbon dioxide into the wellbore. The amount is based on the practical consideration that a typical transport truck has a capacity of 3000 gallons and a portion of the carbon dioxide will be loss during transit. It is not required to fill the tubing string, but it is preferred to do so. Preferably, the amount is in excess of the amount to file the tubing string. While gas wells can be drilled to many different depths, as a rule of thumb, a volume of liquid $CO_2$ which is approximately that of the volume necessary to fill the tubing string will normally be sufficient to at least fill partially the near wellbore formation. Preferably, for economic reasons, the volume of liquid $CO_2$ used is not sufficient to fill the entire near wellbore formation. The near wellbore formation is the portion of the formation which has been fractured. A typical fracturing process may use 70,000 gallons of fracturing fluid. It is not necessary to use 70,000 gallons of liquid $CO_2$ in such a well to achieve beneficial results, because most of the buildup to be removed is believed to be adjacent to the wellbore. In such a well, use of 6,000 gallons of liquid carbon dioxide may be sufficient to provide cleaning which significantly increases well production or places the well back in production. Generally, using more liquid $CO_2$ will not be detrimental to achieving cleaning, but has the disadvantage of increasing the cost with little additional benefit in some applications.

The present invention can be practiced by having liquid $CO_2$ delivered to the well site in transport trucks. The typical conditions for shipping the liquid $CO_2$ in a transport truck are that the liquid $CO_2$ is a 0° F. and maintained at 300 psi. Typically, transport trucks do not have a pump to deliver the liquid $CO_2$ at a sufficient pressure useful for injection directly into the well. Thus, a booster pump can be advantageously employed. Typically, the liquid $CO_2$ leaves the truck at a temperature about 10° F., is pumped through the supplemental pump, such as a pump used for well fracturing, and has a temperature of between about 30° to 35° F. in the tubing. As is known, whether $CO_2$ is a liquid or a gas is dependent upon the temperature, pressure, and volume. As the liquid $CO_2$ reaches the formation, a portion of the liquid $CO_2$ will likely vaporize. Thus, the initial quantity of liquid $CO_2$ may vaporize and then later recondense as well conditions change with the further injection of liquid $CO_2$. Thus, the pumping pressure and rate of pumping should be maintained such that the column of substantially liquid $CO_2$ will eventually be formed in the tubing string and a portion of the gas producing formation adjacent to the wellbore area. Once the tubing string and at least a portion of the near wellbore formation are filled, the pressure at the pump will increase and it is important that the pump pressure not be allowed to increase so that the downhole pressure in the formation exceeds the fracturing pressure of the formation. The rate of pumping will be dependent in part upon the cross sectional area of the tubing string. A pumping rate of from about one to six barrels per minute is useful for typical wellbores of from two to six inches in diameter.

As discussed above, the pressure of the liquid $CO_2$ should be maintained below the fracturing pressure of the formation. Otherwise, the pressure of the liquid $CO_2$ will cause the formation to open up (fracture) and allow the liquid $CO_2$ to bypass the near wellbore area, and rapidly flow into the formation and that formation will close when the well is opened, thereby isolating $CO_2$ in the formation preventing it from returning to surface. Thus, there will be no flow back to clean the well. Most gas wells will have been fractured prior to being put into production and a record of that fracturing pressure is normally available. In other wells, information regarding offset wells may be available from which fracture pressure can be determined. It is preferred to stay significantly below a recorded fracturing pressure to minimize the risk of an inadvertent fracturing of the formation. Thus, preferably, the method is carried out with the liquid $CO_2$ at a pressure about 75% or less than the recorded fracturing pressure, and more preferably at 50% or less than fracturing pressure.

As will be appreciated, there likely will be a continual transformation of a portion of the liquid $CO_2$ to carbon dioxide vapor and loss into the formation even though the pressure of the liquid $CO_2$ is not sufficient to fracture the formation. The pumping rate is selected to overcome this loss. As soon as the desired column of liquid $CO_2$ has been established, the pumping is stopped and the pressure in the well is preferably immediately released. This will cause the liquid $CO_2$ to vaporize and expand, pushing liquid $CO_2$ from the wellbore and the near wellbore formation as well as $CO_2$ vapor, water vapor and dissolved asphaltine condensates. Since liquid $CO_2$ is a good solvent, it mobilizes the blocking elements to facilitate removal.

For a typical well, a downhole pressure of 2,500 psi or less is generally below the fracture pressure. The maximum pressures applied at the well head will vary with the depth of the well. During the pumping process as the near wellbore formation and the wellbore fills with liquid treating solution, the pressure at the pump will start to rise rapidly indicating that liquid is filling the volume and the vaporized gas volume is decreasing. This is also an indication that the larger fractures have filled and the capacity of the smaller fractures to accept liquid $CO_2$ at the rate being pumped has been exceeded. The pump pressure then should be monitored closely so that the pump does not apply pressure in excess of the predetermined treating pressure.

The treating liquid may be of the following composition by volume:

|  | Preferred | Most Preferred |
|---|---|---|
| Liquid $CO_2$ | 84.5 to 100% | 88.8 to 100% |
| Alcohol | 0 to 15% | 0 to 11% |
| Surfactant | 0 to 0.5% | 0 to 0.2% |

The alcohol can be methanol. The alcohol and surfactant can be mixed and metered into the liquid $CO_2$ by drawing it into the line carrying the liquid $CO_2$ by the pumping action and mixed in the line. If desired, a small portion of alcohol can be injected into the well before the treatment liquid.

In the typical well, the pressure of the treatment liquid at the near wellbore area can be maintained at above 2,500 psi or less by a pump pressure of from about 400 to 2,000 psi at the pump depending on well depth and the hydrostatic pressure of the column of liquid in the wellbore.

When the pumping is stopped, the pressure on the wellbore can be released. The pressure can be released immediately after pumping is complete. Release of the pressure will cause a violent blow back out of the well. The effluent can be captured in the lay down tank. Typically, the lay down tank will receive one or more of the following: water, asphaltines, and dissolved scale.

In practice of the invention it is useful to obtain a condensate and water sample from the well to be treated. Such samples are readily available in wells using plunger lift. The samples can be utilized to test which surfactants are compatible for use in the well to be treated. The sample is mixed with various combinations of produced water, a selected surfactant, and alcohol to determine which surfactants, alcohols, and mixtures of alcohol and surfactant can be useful in the cleaning of the well. Preferably the alcohol, such as methanol, is tested with and without a selected surfactant in the presence of water and condensate. The selected surfactant, or alcohol, or combination thereof should not produce an emulsion when mixed with a sample of the well asphaltines or condensates. It is undesirable to form an emulsion in the near wellbore area as the emulsion may block the formation and defeat the purpose of cleaning.

A suitable combination of surfactant, alcohol or combination thereof which does not form an emulsion and will act as a breaker down hole. A breaker composition is useful to reduce the surface tension of water down hole in the formation, thereby reducing the pressure needed to overcome the capillary pressure of the water lodged in the pores of the rock. This assists in the displacement of the water from the formation.

The formation of an emulsion should be avoided. Thus, in a preferred embodiment liquid $CO_2$ alone with no additives can be used to treat the well, to avoid the possibility that the additives could cause the formation of an emulsion. It is preferred to avoid the risk of emulsion formation down hole.

Generally, the treatment liquid (liquid $CO_2$ with or without additives) is injected into the tubing and a packer is used downhole to block off the casing. The treating liquid can be injected into the casing; however, this increases the volume of treatment fluid needed to fill the wellbore. It is preferred to inject only into the tubing to increase the amount of treatment fluid in the near wellbore area. If desired, liquid $CO_2$ can be injected into the casing in order to cool the tubing so that more of the treatment liquid injected into the tubing will remain liquid.

While in a preferred embodiment the wellbore and near wellbore area are filled with treatment liquid, it is possible to accomplish treatment by not filling the wellbore. The hydrostatic head of the treatment liquid will carry it into the near wellbore formation adjacent the wellbore, and $CO_2$ vaporized from the treatment liquid will fill the borehole above the level of the treating liquid. In this embodiment, as the treatment liquid is pumped, the pressure seen at surface will remain constant as the treatment liquid flows into the formation, should increase slightly as the near wellbore area fills and the tubing heats up the treatment fluid vaporizing a portion of it. Once all the treatment fluid has been injected the pressure should be released and back flow out of the wellbore commenced.

The time period of contact of the treatment fluid with the near wellbore area can vary. If sufficient treatment fluid is available, once the near wellbore area and wellbore have been filled, a small constant addition of treatment liquid can be used to make up for loss due to vaporization into the formation, and thus increase contact time. Generally, there is no need for prolonged contact, and pressure may be released as soon as the pumping of treatment liquid has been completed rather than risk vaporization into the formation such that there is no energy left in the treating fluid to propel dissolved material to the surface.

A preferred embodiment of the invention has been described in relation to a well using plunger lift techniques. However, those skilled in the art will recognize that the invention can be used in a variety of wells and wells which do not use plunger lift.

What is claimed is:

1. A method for cleaning a gas well comprising:
   injecting a predetermined quantity of a treatment liquid comprising from 84.5% to 100% liquid carbon dioxide and from 0% to 15.5% of a breaker composition into a wellbore and at least a portion of the near wellbore formation of a gas bearing formation, such that the pressure is below the fracturing pressure of said gas bearing formation; and
   releasing the pressure on said wellbore and allowing the liquid carbon dioxide to vaporize and flow out of the well.

2. A method of claim 1 wherein said pressure of said treatment liquid in the near wellbore formation is about 75% or less of the fracturing pressure said gas bearing formation.

3. A method of claim 1 wherein said pressure of said treatment liquid in the near wellbore formation is about 50% or less of the fracturing pressure said gas bearing formation.

4. A method of claim 1 wherein said treatment liquid is from about 84.5 to 100% liquid carbon dioxide, 0 to about 15% of an alcohol and from 0 to 0.5% surfactant by volume.

5. A method of claim 4 wherein said pressure of said treatment liquid in the near wellbore formation is about 75% or less of the fracturing pressure said gas bearing formation.

6. A method of claim 4 wherein said pressure of said treatment liquid in the near wellbore formation is about 50% or less of the fracturing pressure said gas bearing formation.

7. A method of claim 1 wherein said predetermine quantity of treatment liquid is 2000 gallons or more.

8. A method of claim 1 wherein the treatment liquid consists of liquid carbon dioxide and a breaker composition.

9. A method of claim 1 further comprising the step of injecting a cooling gas between the tubing and the surrounding casing to cool said tubing during the injecting of the said liquid carbon dioxide into said tubing in said wellbore.

10. A method for cleaning a gas well comprising:
    injecting into a wellbore a predetermined quantity of a treatment liquid having from 88.4 to 100% liquid carbon dioxide, 0 to 15% alcohol; and 0 to 0.5% surfactant by volume at a surface pumping pressure less than about 2000 psi; and
    releasing the pressure in the wellbore and allowing the carbon dioxide to vaporize and flow out of the well.

11. A method of claim 10 wherein said surface pumping pressure is less than about 1000 psi.

12. A method of claim 10 wherein said predetermined quantity of a treatment liquid is 2000 gallons or more.

13. A method of claim 8 further comprising the step of injecting a cooling gas between the tubing and the surrounding casing to cool said tubing during the injecting of the said liquid carbon dioxide into said tubing in said wellbore.

14. A method of claim 10 wherein the treatment liquid consists of liquid carbon dioxide and a breaker composition.

15. A method for cleaning a gas well comprising:
    injecting a predetermined quantity of a treatment liquid comprising from 84.5% to 100% liquid carbon dioxide and from 0% to 15.5% of a breaker composition into the wellbore of a gas bearing formation at a pressure in the near wellbore formation that is below the formation fracturing pressure;
    releasing the pressure in the wellbore before all of said liquid carbon dioxide vaporizes; and
    allowing the escape from the wellbore of carbon dioxide formed from the vaporization of said liquid carbon dioxide remaining at the time of the release of pressure from said wellbore.

16. A method of claim 15 wherein said pressure in the near wellbore formation is about 75% or less of the fracturing pressure said gas formation.

17. A method of claim 15 wherein said pressure in the near wellbore formation is about 50% or less of the fracturing pressure said gas formation.

18. A method of claim 15 further comprising the step of injecting a cooling gas between the tubing and the surrounding casing to cool said tubing during the injecting of the said liquid carbon dioxide into said tubing in said wellbore.

19. A method for cleaning a gas well comprising:
    estimating the volume of a treatment liquid comprising from 84.5% to 100% liquid carbon dioxide and from 0% to 15.5% of a breaker composition needed to fill the tubing string of the well, and a portion of the gas bearing formation adjacent to the wellbore;
    injecting the volume of treatment liquid equal to or in excess of the amount estimated to fill the wellbore and a portion of said gas bearing formation adjacent to the wellbore such that the pressure in the area of said gas bearing formation adjacent the wellbore is equal to or less than the fracturing pressure of said gas bearing formation;
    releasing the pressure in said wellbore before all of said liquid carbon dioxide vaporizes so as to vaporize the remaining liquid carbon dioxide to a gas; and
    allowing the vaporized carbon dioxide to flow back to the surface.

20. A method of claim 19 further comprising the step of injecting a cooling gas between said tubing and the surrounding casing to cool said tubing before injecting liquid carbon dioxide into the tubing.

21. A method for cleaning a gas well comprising:
    estimating the volume of liquid carbon dioxide needed to fill the tubing string of the well, and a portion of the gas bearing formation adjacent to the wellbore;
    injecting the volume of liquid carbon dioxide equal to or in excess of the amount estimated to fill the wellbore and a portion of said gas bearing formation adjacent to the wellbore such that the pressure in the area of said gas bearing formation adjacent the wellbore is equal to or less than the fracturing pressure of said gas bearing formation;

releasing the pressure in said wellbore before all of said liquid carbon dioxide vaporizes so as to vaporize the remaining liquid carbon dioxide to a gas;

allowing the vaporized carbon dioxide to flow back to the surface; and injecting a cooling gas between said tubing and the surrounding casing to cool said tubing before injecting liquid carbon dioxide into the tubing.

22. A method for cleaning a gas well comprising:

injecting a predetermined quantity of a treatment liquid of liquid carbon dioxide into a wellbore and at least a portion of the near wellbore formation of a gas bearing formation, such that the pressure is below the fracturing pressure of said gas bearing formation;

releasing the pressure on said wellbore and allowing the liquid carbon dioxide to vaporize and flow out of the well; and injecting a cooling gas between the tubing and the surrounding casing to cool said tubing during the injecting of the said liquid carbon dioxide:into said tubing in said wellbore.

23. A method for cleaning a gas well comprising:

injecting a predetermined quantity of liquid carbon dioxide into the wellbore of a gas bearing formation at a pressure in the near wellbore formation that is below the formation fracturing pressure;

releasing the pressure in the wellbore before all of said liquid carbon dioxide vaporizes;

allowing the escape from the wellbore of carbon dioxide formed from the vaporization of said liquid carbon dioxide remaining at the time of the release of pressure from said wellbore; and injecting a cooling gas between the tubing and the surrounding easing to cool said tubing during the injecting of the said liquid carbon dioxide into said tubing in said wellbore.

* * * * *

UNITED STATES PATENT AND TRADEMARK OFFICE
CERTIFICATE OF CORRECTION

PATENT NO. : 6,988,552 B2  Page 1 of 1
DATED : January 24, 2006
INVENTOR(S) : Dennis Ray Wilson and Thomas A. Bell, Jr.

It is certified that error appears in the above-identified patent and that said Letters Patent is hereby corrected as shown below:

Column 3,
Line 22, after "therefore" insert -- . --.
Line 36, delete "different at the different depths of the liquid" and insert -- the wellbore. As the liquid 26 collects, the surface 28 of the liquid 26 raises. This results in the pressure of the liquid, P1, the hydrostatic pressure, increasing. This pressure will be different at the different depths of the liquid. --.

Signed and Sealed this

Thirteenth Day of June, 2006

JON W. DUDAS
*Director of the United States Patent and Trademark Office*